United States Patent [19]

Manzoni

[11] Patent Number: 4,598,605
[45] Date of Patent: Jul. 8, 1986

[54] MECHANISM WITH TORQUE-LIMITING DEVICE FOR CONTROLLING A REARVIEW-MIRROR

[75] Inventor: Stéphane Manzoni, Saint-Claude, France

[73] Assignee: Manzoni Bouchot, France

[21] Appl. No.: 491,633

[22] Filed: May 5, 1983

[30] Foreign Application Priority Data

May 13, 1982 [FR] France .................. 82 08347

[51] Int. Cl.⁴ ............................................. F16C 1/10
[52] U.S. Cl. ................................... 74/501 M; 24/481; 24/487; 350/636
[58] Field of Search ............. 74/501 M; 350/289, 625, 350/626, 627, 634; 403/90, 76, 141, 122; 248/481, 475.1, 484, 487

[56] References Cited

U.S. PATENT DOCUMENTS

| | | | |
|---|---|---|---|
| 2,614,437 | 10/1952 | Meggit | 74/501 X |
| 2,703,407 | 3/1955 | Henoch et al. | 403/90 X |
| 3,853,414 | 12/1974 | Hirano et al. | 403/122 X |
| 3,934,489 | 1/1976 | Bottrill | 74/501 M |
| 4,202,603 | 5/1980 | Miyauchi | 350/289 |
| 4,266,883 | 5/1981 | Riester et al. | 403/122 X |
| 4,273,417 | 6/1981 | Mittelhauser | 350/289 |
| 4,324,454 | 4/1982 | Kumai | 350/289 |

FOREIGN PATENT DOCUMENTS

| | | |
|---|---|---|
| 59073 | 9/1982 | European Pat. Off. . |
| 2840789 | 4/1980 | Fed. Rep. of Germany ...... 350/634 |
| 2846586 | 5/1980 | Fed. Rep. of Germany ...... 350/636 |
| 3213773 | 12/1982 | Fed. Rep. of Germany ...... 350/289 |
| 35933 | 3/1979 | Japan . |
| 312795 | 6/1929 | United Kingdom ................ 350/631 |
| 2054496 | 2/1981 | United Kingdom ................ 350/636 |

Primary Examiner—Kenneth J. Dorner
Assistant Examiner—Rodney M. Lindsey
Attorney, Agent, or Firm—Remy J. VanOphem

[57] ABSTRACT

A torque-limiting device for a mechanism controlling a vehicle rearview mirror in which the mirror is fixed on a supporting member mounted for pivoting about two perpendicular axes, on a yoke integral with a baseplate mounted in the casing. The tubular extension with the threaded portion of the control members is produced from a deformable material and is provided with at least one axial slot issuing into one of the ends of the tubular extension in such a way that any force applied axially on the control member enables the threaded end portion to disengage from the threaded hole, and the pinions are mounted on the bottom of a casing by way of a ball joint which is resiliently held in position so that the control members are always in alignment with the axis of the driving pinions.

11 Claims, 5 Drawing Figures

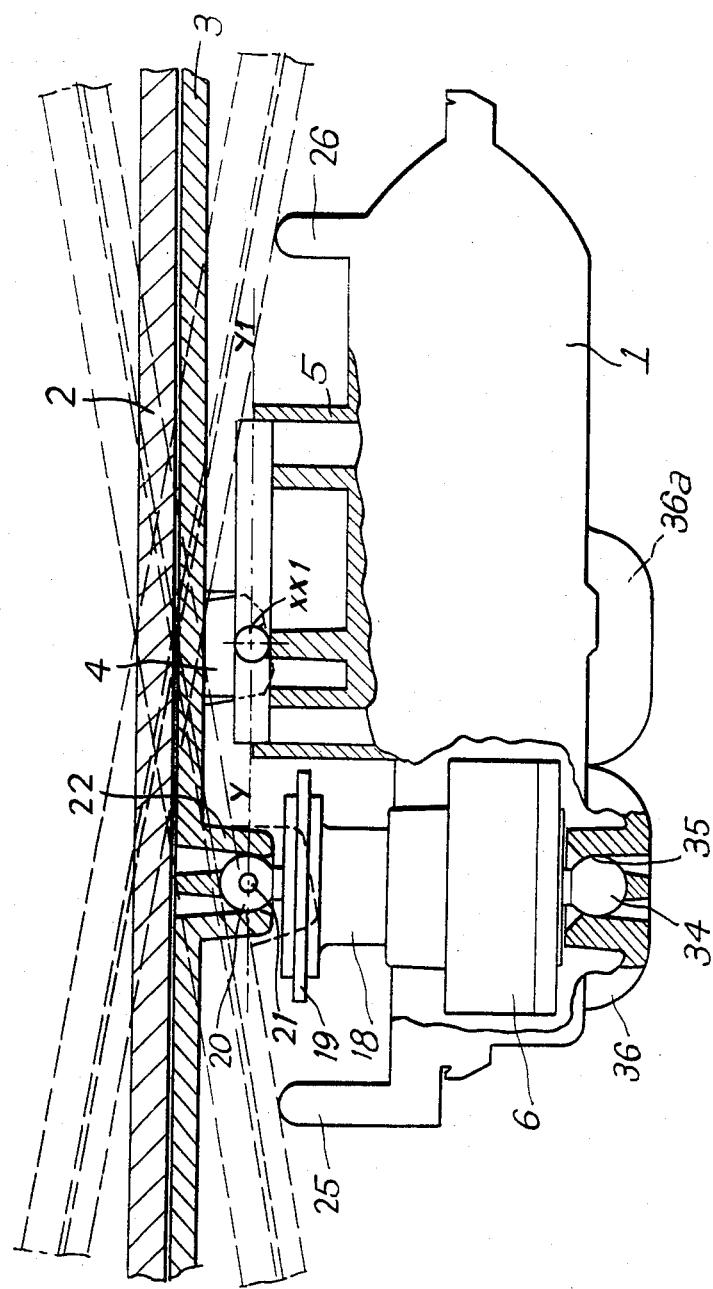

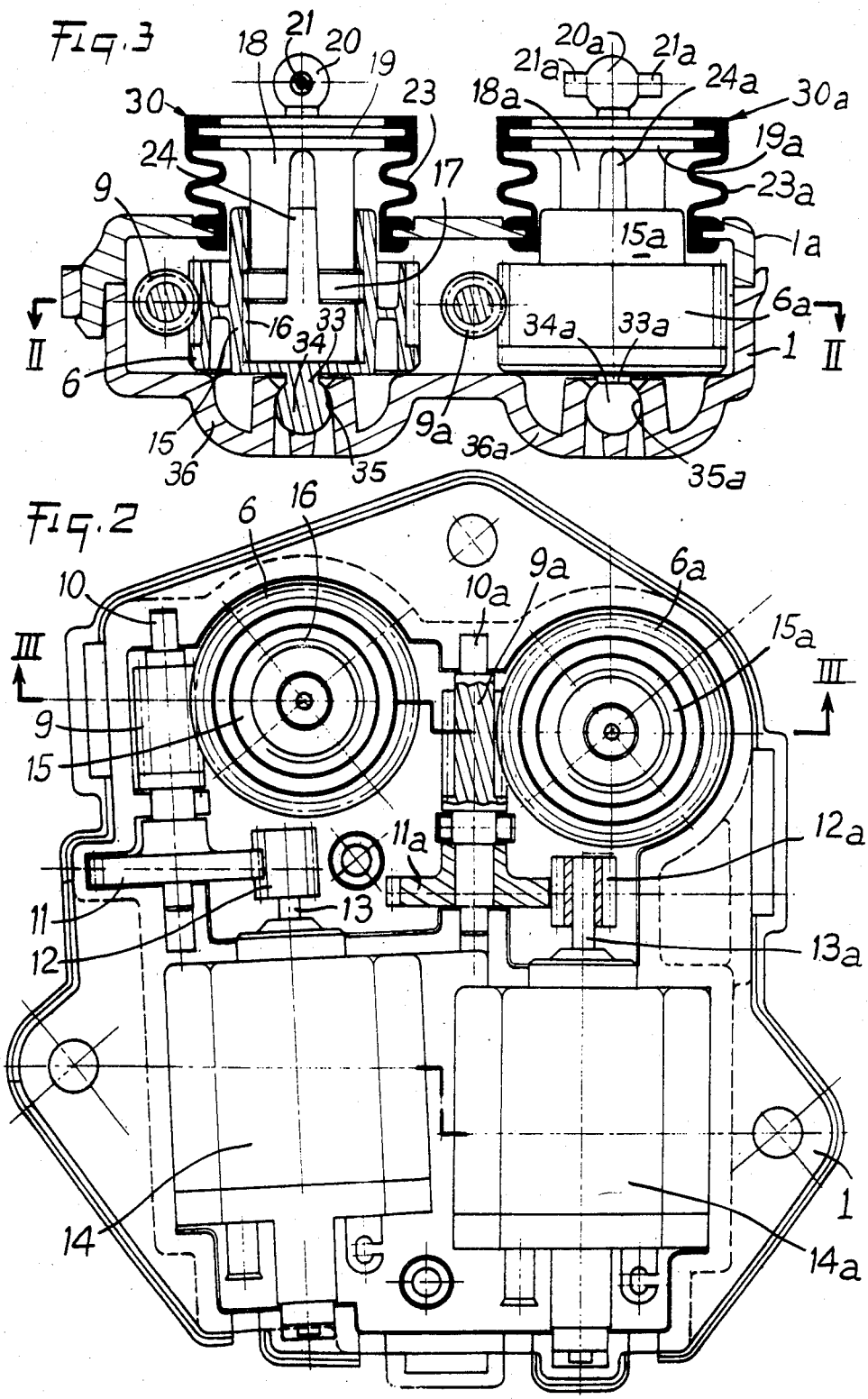

MECHANISM WITH TORQUE-LIMITING DEVICE FOR CONTROLLING A REARVIEW-MIRROR

BACKGROUND OF THE INVENTION

1. Field of the Invention

The present invention relates to a mechanism with a torque-limiting device for controlling a rearview mirror.

2. Description of the Prior Art

A device is known for controlling a vehicle rearview mirror, in which the mirror is fixed on a supporting member mounted for pivoting about two perpendicular axes on a yoke integral with a casing mounted in a cup-shaped member. The casing contains two pinions which are driven in rotation by driving members. Furthermore, the pinions are each provided with a central hole in which is engaged the threaded part of a tubular element integral with control members hinged on the rear face of the mirror supporting member in order to communicate a pivoting movement to the mirror supporting member about the two perpendicular axes.

In this device, the pinions being driven in rotation by electrical motors, it is necessary to provide a torque-limiting mechanism in order to allow the threaded portion of the control member to disengage from the tapped hole provided in the pinions whenever a pressure is applied axially on the control members by pushing or pulling, especially when the mirror comes to a stop at the end of a stroke.

Additionally, as the pinions are mounted on the baseplate by means of a screw and washer, permanent alignment of the pinion axis relative to the control member axis is prevented, thus, producing a strong mechanical resistance. This particular type of connection results in the added disadvantage of presenting an axial play which, even though very small, generates a vibration of the mirror and gives shaking images.

It is also known from French Pat. No. 79 24114 to produce a mirror controlling device whose object is to obtain an alignment of the transmission axis of the control device.

This particular embodiment, however, requires extremely narrow production tolerances between the different elements. The elements with very strict tolerances are numerous and include endless screw wheels which are mounted inside upper and lower casings to allow the rotation of the screws resting on the bottom of the lower casing by a semi-spherical bottom and by a sliding surface of shape corresponding to a curved surface situated on the lower part of the screws. This obviously gives rise to major manufacturing difficulties.

SUMMARY OF THE INVENTION

According to the present invention, the tubular extension with the threaded portion of the control members is produced from a deformable material and is provided with at least one axial slot issuing into one of the ends of the tubular extension in such a way that any force applied axially on the control member enables the thread to disengage from the tapped hole in the central boss, and the pinions are mounted on the bottom of a casing by way of a ball joint which is resiliently held in position so that the control members are always in alignment with the axis of the driving pinions.

It is possible to obtain this particular arrangement because of the automatic alignment which results due to the ability of the ball to move inside its resilient bearing on the bottom of the casing, thus, eliminating the mechanical resistances and procuring increased reliability of torque transmission. When the mirror-holder is being operated, the disengagement of the endless screw from the tangent wheel is extremely small and does not affect the transmission.

Moreover, this configuration enables elimination of the washer and the screw and results in reduced assembly time, thus lowering the manufacturing costs. The ball joint is fitted in by exerting a pressure thereon so as to resiliently spread apart the flexible members of the bearing, and to hold the ball in position without play when the flexible members return resiliently into place, permitting nonetheless the rotation of the ball when the mirror-holder is moved.

Finally, it is difficult, during the manufacture, to assemble the tangent wheel freely and with no axial play with the pinion because of the tolerances to be observed for the set dimension of the bottom of the casing and for the shoulder of the tangent wheel or pinion mounted for rotating inside a bearing.

But in all mechanisms for controlling the mirror-holder, any axial play, even a very small one, of the transmission, generates vibrations of the mirror and gives shaking images. On the one hand, the tubular extension with the threaded portion of the control members is resilient and rests on the inner thread of the pinions, which gives a play-free assembly. On the other hand, the fitting of the ball joint inside its bearing on the bottom of the lower casing presents a greater resistance to axial wrenching than the torque-limiting device formed by the threaded portion in engagement with the inner thread of the pinions so that when a pressure is exerted on the mirror-holder, the torque-limiting device is released.

As a result, the improved device according to the present invention can work freely, without play and with a play take-up supplied by the resilient element composing it.

With the configuration according to the present invention, it is possible to obtain a torque-limiting device which is very simple, efficient, and which requires a minimum space inside the mechanism.

BRIEF DESCRIPTION OF THE DRAWINGS

The invention will be more readily understood on reading the following description with reference to the accompanying drawings in which:

FIG. 1 is an external view of the mechanism for controlling a rearview mirror;

FIG. 2 is an elevational view of a cross-section along line II—II of FIG. 3 of the mirror controlling mechanism, the upper cover being removed on the side of one of the motors;

FIG. 3 is an offset cross-sectional view along line III—III of FIG. 2 and of the lower part and of the cover of the casing;

DETAILED DESCRIPTION OF THE PREFERRED EMBODIMENT

Figure 4:
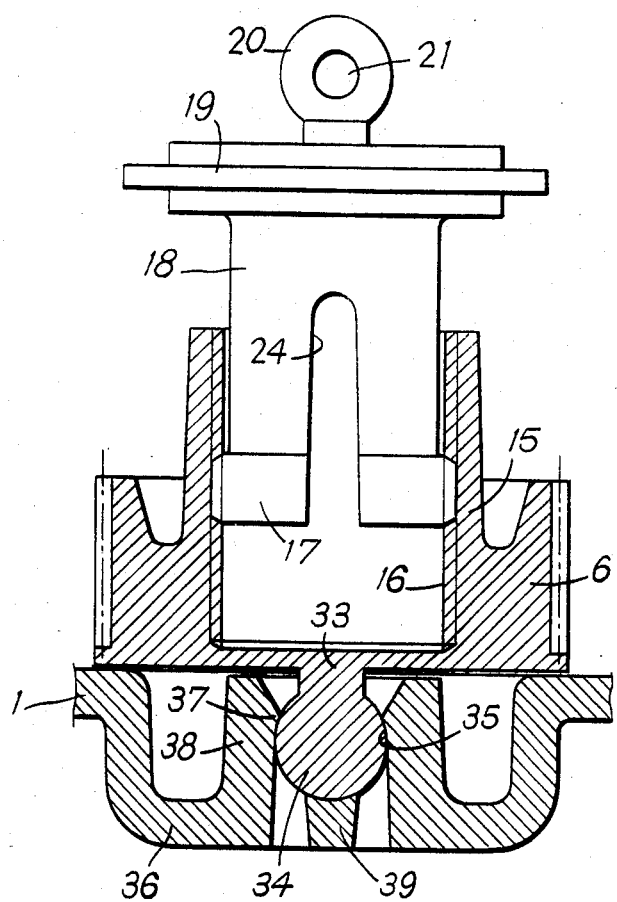
FIG. 4 is an elevational view of a cross-section of the torque-limiting device and of the mechanism for mounting a pinion on the base of the casing.

Referring to FIGS. 1, 2, and 3, a preferred embodiment of a vehicle rearview mirror control device is shown. The control device includes a cup-shaped member, not shown, in which is mounted in a known manner a casing 1 on which a mirror 2 is fitted so as to be pivotable about two perpendicular axes XX1 and YY1, the casing 1 having a cover 1a removably secured thereto. The mirror 2 is secured to a supporting member 3, provided with two lugs 4, by which the supporting member 3 is mounted for pivoting about the axis XX1 which is connected by known means to the axis YY1 and to a yoke 5 of the casing 1.

Inside the casing 1, as shown in FIGS. 2 and 3, are rotatably mounted two tangent wheels or pinions 6 and 6a, each of which respectively is extended on one side by a rod 33 and 33a carrying a spherical member or ball joint 34 and 34a which is freely mounted in a spherical bearing 35 and 35a of corresponding shape provided inside a boss 36 and 36a located at the bottom of the casing 1. The spherical bearing 35, as illustrated in FIG. 4, is defined by an extended sleeve portion 38 in deformable material and at the bottom 39 of the boss 36. The extended sleeve portion of the boss has a central opening with a lip 37 which constitutes the edge of the opening of the extended sleeve portion of the boss which engages the spherical member or ball joint 34.

To assemble the tangent wheels or pinions 6 and 6a to the boss 36, it suffices to force-fit the spherical member of the ball joint 34 into the central opening by deforming the lip 37 which, after engagement of the spherical member 34, elastically covers the latter and holds it in place preventing play inside its housing.

Figure 5:
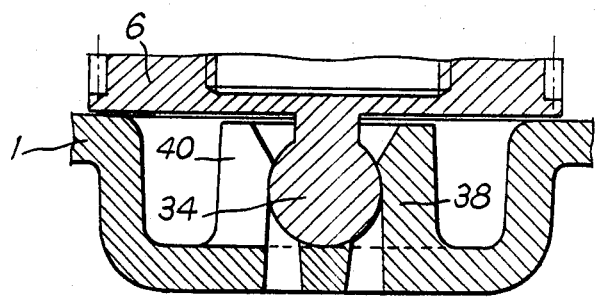
FIG. 5 is an elevational view of a cross-section of an alternate embodiment of FIG. 4.

To obtain a play take-up on the ball joint 34, it is possible to provide the extended sleeve portion 38 with longitudinal slots 40 as illustrated in FIG. 5.

The tangent wheels or pinions 6 and 6a, illustrated in FIGS. 2 and 3, mesh externally respectively with endless screws or pinions 9 and 9a. The endless screws or pinions 9 and 9a are respectively fixed on axles 10 and 10a which carry the pinions 11 and 11a which in turn mesh with the pinions 12 and 12a wedged on the end of the driving shafts 13 and 13a of the electric motors 14 and 14a fixed on the bottom of the casing.

The tangent wheels or pinions 6 and 6a are provided with a central boss 15 and 15a having a threaded hole 16 and 16a (not shown) in which is engaged a threaded end portion 17 and 17a (not shown) of a tubular extension 18 and 18a of a control member 30 and 30a. The flanged end 19 and 19a of the control member 30 and 30a carries a ball joint 20 and 20a. The ball joint 20 and 20a is provided with lugs 21 and 21a which engage inside a corresponding spherical housing provided in a boss 22 situated on the rear face of the supporting member 3 as shown in FIG. 1, the lugs 21 and 21a serving to prevent rotation of the control members 30 and 30a as they are driven axially by the rotation of the pinions 6 and 6a.

The flanged end 19 and 19a of the control member 30 and 30a which extends outside of the casing through openings provided, therefore, is connected by way of deformable bellows 23 and 23a to the rims of the openings to provide a seal between the flanged ends 19 and 19a and the openings in the casing 1.

The tubular extensions 18 and 18a of the control members 30 and 30a are produced from a deformable material, such as plastic, and are provided with axial slots 24 and 24a extending from one end of the tubular extension, so as to permit the tubular extension to deform radially when an axial force is applied on one of the control members. The axially applied force causes a disengagement of the threads on the threaded end portion 17 from the threads in the threaded hole 16.

In operation, when one of the motors 14 is actuated, it drives the tangent wheels of the pinion 6 in rotation via the pinions 12 and 11 and the endless screw 9. The rotation of the tangent wheel 6 and 6a is transformed into a linear displacement of the control member 30a and 31 relative the pinion 6 and 6a. The reaction between the threaded hole 16 and the threaded end portion 17 of the tubular extension 18 and 18a which, by way of its ball joint 20 or 20a, transmits the movement to the mirror 2, which mirror moves selectively about the axes XX1 and YY1 depending on which of the motors 14 and 14a is powered. When the mirror supporting member 3 comes to rest against one of the stop members 25 and 26 at the end of a rotation about the axis XX1, and when the motor 14 or 14a continues to turn, an axial force is applied on the tubular extension 18 or 18a which causes the disengagement of the tubular extension from the tangent wheel to avoid damaging one of the members.

It is, moreover, possible with the disposition according to the invention, and because of the ball joint assembly of the tangent wheels 6 and 6a with the casing 1, to insure that the axis of the control member 30 is always in alignment with the tangent wheel or pinion 6 and 6a regardless of the position of the mirror.

The invention is in no way limited to the embodiment described hereinabove but on the contrary covers any modifications that can be brought thereto without departing from its scope or its spirit.

What is claimed is:

1. A torque-limiting mechanism for operating a rear-view mirror of a vehicle, said torque-limiting mechanism comprising:

a casing having a cavity therein;

a cover member mounted to said casing, said cover member having at least one opening therein;

a support member attached to said mirror, said support member further being spaced a predetermined distance from said cover member of said casing;

universal pivot joint means interposed said support member and said cover member of said casing, said universal pivot joint means adapted to allow pivoting movement of said mirror about at least one axis;

rotation to translation means mounted in said cavity of said casing, said rotation to translation means comprising:

at least one pinion gear member mounted in said cavity of said casing;

at least one selectively movable control member having a central axis and being mounted to said at least one pinion gear member for movement relative thereto, said at least one selectively movable control member further having one end portion and an opposite end portion:

second pivot joint means located at said one end portion of said at least one selectively movable control member, said second pivot joint means adapted to cooperate with said support member for pivot motion of said support member relative to said at least one selectively movable control member;

a first spherical ball joint member means adjoining said at least one pinion gear member, said first spherical ball joint member means being defined by a spherical radius having a center of curvature lying substantially along said central axis of said at least one selectively movable control member; and motor means mounted in said casing at a preselected location relative to said at least one pinion gear member and adapted to rotate said at least one pinion gear member.

2. The torque limiting mechanism as claimed in claim 1 wherein said cover member has two openings therein and said second pivot joint means interposed said support member and said cover member of said casing is adapted to allow pivoting movement to said mirror about two substantially perpendicular axes, and further comprising:

a second pinion gear member mounted in said cavity of said casing;

a second selectively movable control member having a central axis and being mounted to said second pinion gear member for movement relative thereto, said second selectively movable control member further having one end portion and an opposite end portion;

third pivot joint means located at said one end portion of said second selectively movable control member, said third pivot joint means adapted to cooperate with said support member for pivot support of said support member relative to said second selectively movable control member;

a second spherical ball joint member means adjoining said second pinion gear member, said second spherical ball joint member means being defined by a spherical radius having a center of curvature lying substantially along said central axis of said second selectively movable control member; and second motor means mounted in said casing at a preselected location relative to said second pinion gear member and adapted to rotate said second pinion gear member.

3. The torque-limiting mechanism as claimed in claim 1 wherein said second pivot joint means further comprises a pivot center lying on said central axis of said at least one selectively movable control member and wherein said central axis of said at least one selectively movable control member and said pivot center of said second pivot joint means are aligned.

4. The torque-limiting mechanism as claimed in claim 1 wherein said at least one pinion gear member comprises a threaded hole and said second pivot joint means comprises means to prevent rotation of said at least one selectively movable control member about said central axis, and further comprising:

thread means located at said opposite end portion of said at least one selectively movable control member, said thread means engaging said threaded hole of said at least one pinion gear member to move said at least one selectively movable control member relative to said at least one pinion gear member such that as said at least one pinion gear member is rotated by said motor means said at least one selectively movable control member moves non-rotatably in a substantially axial direction.

5. The torque-limiting mechanism as claimed in claim 4 wherein said rotation to translation means further comprises resiliently yieldable means integral with said opposite end portion of said at least one selectively movable control member such that when a driving force applied to one of said at least one selectively movable control member and said at least one pinion gear member is opposed by a predetermined resistance to responsive movement, said resiliently yieldable means yields in a radially inward direction to disengage said thread means from said threaded hole such that said at least one pinion gear member is rotated by said motor means and said at least one selectively movable control member remains substantially axially stationary relative to said at least one pinion gear member.

6. The torque-limiting mechanism as claimed in claim 1 wherein said casing further comprises first spherical ball joint surface means, said first spherical ball joint surface means being complementary to said first spherical ball joint member means such that said first spherical ball joint member means and said first spherical ball joint surface means cooperate to provide a universal joint motion of said at least one selectively movable control member relative to said casing.

7. The torque-limiting mechanism as claimed in claim 1 wherein said one end portion of said at least one selectively movable control member extends through said at least one opening in said cover member of said casing.

8. The torque-limiting mechanism as claimed in claim 7 further comprising means for sealing said at least one opening in said cover member of said casing, said sealing means being attached at one end to said at least one selectively movable control member and at the other opposite end being mounted to said at least one opening of said cover member such as to seal a portion of said rotation to translation means within said casing.

9. A torque-limiting mechanism for operating a rearview mirror of a vehicle, said torque-limiting mechanism comprising:

a casing having a cavity therein;

a cover member mounted to said casing, said cover member having at least one opening therein;

a support member attached to said mirror, said support member further being spaced a predetermined distance from said cover member of said casing;

universal pivot joint means interposed said support member and said casing, said universal pivot joint means adapted to allow pivoting movement of said mirror about at least two perpendicular axes;

rotation to translation means mounted in said cavity of said casing, said rotation to translation means comprising:

at least one pinion gear member mounted in said cavity of said casing;

at least one selectively movable control member having a central axis and being mounted to said at least one pinion gear member for movement relative thereto, said at least one selectively movable control member further having one end portion and an opposite end portion;

second pivot joint means located at one end portion of said at least one selectively movable control member, said second pivot joint means adapted to cooperate with said support member for pivot motion of said support member relative to said at least one selectively movable control member, said second pivot joint means further comprising a pivot center lying on said central axis of said at least one selectively movable control member; and a first spherical ball joint surface means adjoining said at least one pinion gear member, said first spherical ball joint surface means being defined by a spherical radius having a center of curvature lying substantially along said central axis of said at least one selectively movable control member such that said center of curvature of said spherical ball joint surface means, said central axis of said at least one selectively movable control member, and said pivot center of said second pivot joint means are aligned.

10. The torque-limiting mechanism as claimed in claim 9 wherein said at least one pinion gear member has a central axis and wherein said central axis of said at least one selectively movable control member and said central axis of said at least one pinion gear member are substantially coaxial.

11. A torque-limiting mechanism for operating a rearview mirror of a vehicle, said torque-limiting mechanism comprising:

a casing having a cavity therein;

a cover member mounted to said casing, said cover member having at least one opening therein;

a support member attached to said mirror, said support member further being spaced a predetermined distance from said cover member of said casing;

universal pivot joint means interposed said support member and said casing, said universal pivot joint means adapted to allow pivoting movement of said mirror about at least two perpendicular axes;

rotation to translation means mounted in said cavity of said casing, said rotation to translation means comprising:

at least one pinion gear member mounted in said cavity of said casing;

at least one selectively movable control member having a central axis and being mounted to said at least one pinion gear member, said at least one selectively movable control member further having one end portion and an opposite end portion;

second pivot joint means located at said one end portion of said at least one selectively movable control member, said second pivot joint means adapted to cooperate with said support member for pivot motion of said support member relative to said at least one selectively movable control member, said second pivot joint means further comprising a pivot center lying on said central axis of said at least one selectively movable control member, said one end portion of said at least one selectively movable control member extending through said at least one opening of said cover member of said casing, said second pivot joint means comprising means to prevent rotation of said at least one selectively movable control member about said central axis;

a first spherical ball joint means adjoining said at least one pinion gear member, said first spherical ball joint means being defined by a spherical radius having a center of curvature lying substantially along said central axis of said at least one selectively movable control member, such that said center of curvature of said first spherical ball joint means, such central axis of said at least one selectively movable control member, and said pivot center of said second pivot joint means are aligned;

helical thread means located on said at least one pinion gear member and at the opposite end portion of said at least one selectively movable control member, such that rotation of said at least one pinion gear member moves said at least one selectively movable control member non-rotatably in an axial direction;

resiliently yieldable means integral with said opposite end portion of said at least one selectively movable control member such that when a driving force applied to one of said at least one selectively movable control member and said at least one pinion gear member is opposed by a predetermined resistance to responsive movement, said resiliently yieldable means yields in a radially inward direction to disengage said helical thread means such that said at least one pinion gear member is rotated by said driving force and said at least one selectively movable control member remains substantially axially stationary relative to said at least one pinion gear member; and means for sealing said at least one opening in said cover means of said casing, said sealing means being attached at one end to said at least one selectively movable control member and at the other end being mounted to said at least one opening of said cover member, such as to seal a portion of said rotation to translation means within said casing.

* * * * *

UNITED STATES PATENT AND TRADEMARK OFFICE
CERTIFICATE OF CORRECTION

PATENT NO. : 4,598,605

DATED : July 8, 1986

INVENTOR(S) : Stephane Manzoni

It is certified that error appears in the above-identified patent and that said Letters Patent is hereby corrected as shown below:

Column 4, line 7, delete "30a" and insert ---- 30 ----.

Column 4, line 8, delete "31" and insert ---- 30a ----.

Signed and Sealed this

Seventh Day of April, 1987

Attest:

Attesting Officer

DONALD J. QUIGG

Commissioner of Patents and Trademarks